(12) United States Patent
Chabaille et al.

(10) Patent No.: US 10,041,411 B2
(45) Date of Patent: Aug. 7, 2018

(54) COMPACT DOSING DEVICE FOR AN INJECTOR WITH TWO FUEL CIRCUITS FOR AN AIRCRAFT TURBOMACHINE

(71) Applicant: SNECMA, Paris (FR)

(72) Inventors: Christophe Chabaille, Houilles (FR); Sebastien Loval, Bussy Saint Georges (FR)

(73) Assignee: SNECMA, Paris (FR)

( * ) Notice: Subject to any disclaimer, the term of this patent is extended or adjusted under 35 U.S.C. 154(b) by 275 days.

(21) Appl. No.: 14/772,924

(22) PCT Filed: Mar. 5, 2014

(86) PCT No.: PCT/FR2014/050499
§ 371 (c)(1),
(2) Date: Sep. 4, 2015

(87) PCT Pub. No.: WO2014/135797
PCT Pub. Date: Sep. 12, 2014

(65) Prior Publication Data
US 2016/0017808 A1    Jan. 21, 2016

(30) Foreign Application Priority Data

Mar. 5, 2013  (FR) ...................................... 13 51946
Oct. 18, 2013 (FR) ...................................... 13 60197

(51) Int. Cl.
*F02C 7/22*         (2006.01)
*F16K 11/07*        (2006.01)
(Continued)

(52) U.S. Cl.
CPC ................ *F02C 7/22* (2013.01); *F02C 7/232* (2013.01); *F02C 9/263* (2013.01); *F16K 11/02* (2013.01);
(Continued)

(58) Field of Classification Search
CPC .. F02C 7/22; F02C 7/232; F02C 9/263; F16K 11/02; F16K 11/07; F16K 11/0716;
(Continued)

(56) References Cited

U.S. PATENT DOCUMENTS

| 4,570,668 A | 2/1986 | Burke et al. |
| 4,726,396 A | 2/1988 | Bradley et al. |

(Continued)

FOREIGN PATENT DOCUMENTS

| EP | 0 150 619 | 8/1985 |
| FR | 2 817 017 | 5/2002 |

OTHER PUBLICATIONS

International Search Report dated Jun. 16, 2014 in PCT/FR14/050499 Filed Mar. 5, 2014.
(Continued)

*Primary Examiner* — Gerald L Sung
*Assistant Examiner* — Scott Walthour
(74) *Attorney, Agent, or Firm* — Oblon, McClelland, Maier & Neustadt, L.L.P.

(57) ABSTRACT

A fuel dosing device for a fuel injector of an aircraft turbomachine, including an opening, a movable member for sealing the opening, and elastic return, with the member able to be displaced under the effect of the fuel pressure. The device includes a first outlet communicating with a primary circuit of the injector as well as a second outlet communicating with a secondary circuit. In addition, it is designed such that up to a defined level of displacement of the sealing member, the latter allows the fuel coming from the opening to reach the first outlet and, only beyond the defined level of displacement, the member allows the fuel coming from the opening to reach the second outlet.

10 Claims, 4 Drawing Sheets

(51) Int. Cl.
  *F16K 11/02* (2006.01)
  *F02C 7/232* (2006.01)
  *F23K 5/14* (2006.01)
  *F23R 3/36* (2006.01)
  *F02C 9/26* (2006.01)
(52) U.S. Cl.
  CPC .......... *F16K 11/07* (2013.01); *F16K 11/0716* (2013.01); *F23K 5/147* (2013.01); *F23R 3/36* (2013.01); *F23N 2035/16* (2013.01); *F23N 2035/24* (2013.01); *Y02T 50/671* (2013.01); *Y10T 137/7929* (2015.04)
(58) Field of Classification Search
  CPC .. F23K 5/147; F23N 2035/16; F23N 2035/24; F23R 3/28; F23R 3/36; Y10T 137/7929
  See application file for complete search history.

(56) References Cited

U.S. PATENT DOCUMENTS

| | | | |
|---|---|---|---|
| 5,732,730 A | 3/1998 | Shoemaker et al. | |
| 2009/0173810 A1* | 7/2009 | Rodrigues | F02C 7/232 |
| | | | 239/533.3 |
| 2010/0037615 A1* | 2/2010 | Williams | F16K 15/186 |
| | | | 60/741 |

OTHER PUBLICATIONS

French Search Report dated Oct. 11, 2013 in Application No. FR 1351946 Filed Mar. 5, 2013.
French Search Report dated Feb. 24, 2014 in Application No. FR 1360197 Filed Oct. 18, 2013.

* cited by examiner

COMPACT DOSING DEVICE FOR AN INJECTOR WITH TWO FUEL CIRCUITS FOR AN AIRCRAFT TURBOMACHINE

TECHNICAL FIELD

This invention relates to the field of fuel injectors for an aircraft turbomachine. It relates more precisely to dual circuit fuel injectors, namely a primary circuit for small flow rates and a secondary circuit for higher flow rates.

The invention applies to all types of aircraft turbomachines, in particular turbojet engines and turbochargers.

PRIOR ART

A dual circuit fuel injector is for example known from document FR 2 817 017. Conventionally, a shut-off valve is provided, also called a sealing valve as it makes it possible to provide a tight connection that prevents the fuel, located in the fuel circuit, from penetrating into the combustion chamber during the stopping of the engine. When the pressure differential on either side of this valve is such that it causes it to open, the fuel is delivered on the one hand to the primary circuit of the injector, and on the other hand to a metering valve that provides access to the secondary circuit of the injector. This metering valve allows the fuel to pass when the fuel pressure differential on either side of the latter reaches a high value, for example 7 bars. According to its displacement, depending on the pressure differential, the metering valve adjusts the quantity of fuel injected into the combustion chamber.

Although this conventional solution provides satisfaction, it can be improved in terms of total mass, encumbrance, and risk detrimental interactions between the two valves.

DISCLOSURE OF THE INVENTION

The invention therefore has for purpose to overcome at least partially the disadvantages mentioned hereinabove, concerning the realisations of prior art.

To do this, the invention has for object a fuel dosing device for a fuel injector of an aircraft turbomachine, with the device comprising an opening for the intake of fuel, a movable member for sealing the opening, as well as elastic return means designed to return the sealing member in the direction of a closed position wherein the member closes off said opening in a sealed manner, with the member being designed to be displaced from its closed position under the effect of the fuel pressure that is applied to this member.

The metering device comprises a first outlet intended to communicate with a primary circuit of the injector as well as a second outlet intended to communicate with a secondary circuit of the injector, and it is designed such that up to a defined level of displacement of the sealing member in the direction of a maximum open position, the sealing member allows the fuel coming from said opening to reach said first outlet. In addition, only beyond said defined level of displacement of the member, the latter allows the fuel coming from said opening to reach said second outlet.

According to the invention, the metering device comprises:
a hollow outer body;
a hollow intermediate body housed in the outer body, said opening being made in said intermediate body provided with a seat for receiving the sealing member;
said sealing member houses slidably movable in said intermediate body;
a fuel flow space provided between the intermediate and outer bodies, the intermediate body being provided with orifices for the fuel to pass from the inside of this intermediate body to said fuel flow space, said flow space communicating with said first outlet;
a secondary opening for the fuel to pass through, provided on the intermediate body, the secondary opening being intended to be sealed by the movable member provided it has not reached said defined level of displacement, and intended to be released when the movable member is between the defined level of displacement and its maximum opening position, said secondary opening communicating with said second outlet.

The invention is particularly advantageous in that it implements a single movable sealing member making it possible to control the supply of the primary and secondary circuits of the injector. With respect to the solution with two valves in series of prior art, this reduces the possible interactions between the two valves. The invention also makes it possible to reduce the encumbrance, the total mass, the number of parts, and the friction between the latter.

Preferably, the section for the passage of fuel on the secondary opening changes according to the relative position of the member with respect to this opening.

Preferably, beyond said defined level of displacement of the sealing member, the latter allows the fuel coming from said opening to reach said second outlet and said first outlet. Consequently, although it could be otherwise, the device is designed in such a way that the first outlet continues to be supplied with fuel when the second outlet is supplied.

Preferably, said elastic return means comprise at least one first spring and a second spring, said second spring being arranged in such a way as to not be solicited by the sealing member over at least a portion of the travel of the latter from its closed position, and said first and second springs are arranged in such a way as to each be solicited by the sealing member when the latter is at said defined level of displacement. Other configurations are however possible, without leaving the scope of the invention. In particular, it could entail a single spring. However, the solution with two springs or more, such as presented hereinabove, allows for a greater latitude of adjustment for the metering device.

Preferably, said first and second springs are arranged in parallel. The first and second springs are in particular located according to the axis of the device, in particular concentrically about this axis.

According to an additional characteristic, the second spring has a stiffness that is greater than the first spring. Alternatively, the second spring can be more prestressed than the first spring in closed position.

Preferably, the movable member defines a cavity inside of which the fuel is intended to transit in order to reach said second outlet. It could also be provided to have the fuel flow exteriorly to the movable sealing member, in the direction of the second outlet.

According to a particular embodiment, said second spring is provided between a stop of the intermediate body and a support part, and the movable sealing member has an additional support part intended to contact said support part only starting from and beyond said defined level of displacement, in the direction of its maximum open position.

Alternatively, said second spring is provided between a stop and a support part of the movable member, the movable sealing member having an engaging element configured to engage the support part only starting from and beyond said defined level of displacement in the direction of the maximum open position of the movable sealing member.

The support part is in particular able to solicit the second spring in compression according to the pressure exerted by the fuel in the metering device on the movable member.

The defined level of displacement of the movable sealing member is then reached by the engaging of the support part by the engaging element after having consumed at least partially the clearance present at rest between the support part of the movable member and the engaging element.

In this configuration, the support part is preferably a safety valve. The safety valve provides as such a sealing function for the fuel metering device, alone or combined with other elements of the movable member.

According to an additional characteristic, the movable sealing member in particular comprises a piston and the support part.

When the support part has a portion with an oblong shape, for example a stem valve, the engaging element is preferably a groove in the piston. The invention also has for object a fuel injector for aircraft turbomachine comprising at least one metering device such as described hereinabove, said first outlet communicating with a primary circuit of the injector, and the second outlet communicating with a secondary circuit of this same injector.

The invention also has for object an aircraft turbomachine combustion chamber comprising a plurality of fuel injectors such as described hereinabove.

Finally, the invention has for object an aircraft turbomachine comprising such a combustion chamber.

Other advantages and characteristics of the invention shall appear in the unrestricted detailed description hereinbelow.

BRIEF DESCRIPTION OF THE DRAWINGS

This description shall be made with regards to the annexed drawings among which.

DETAILED DISCLOSURE OF PREFERRED EMBODIMENTS

Figure 1:
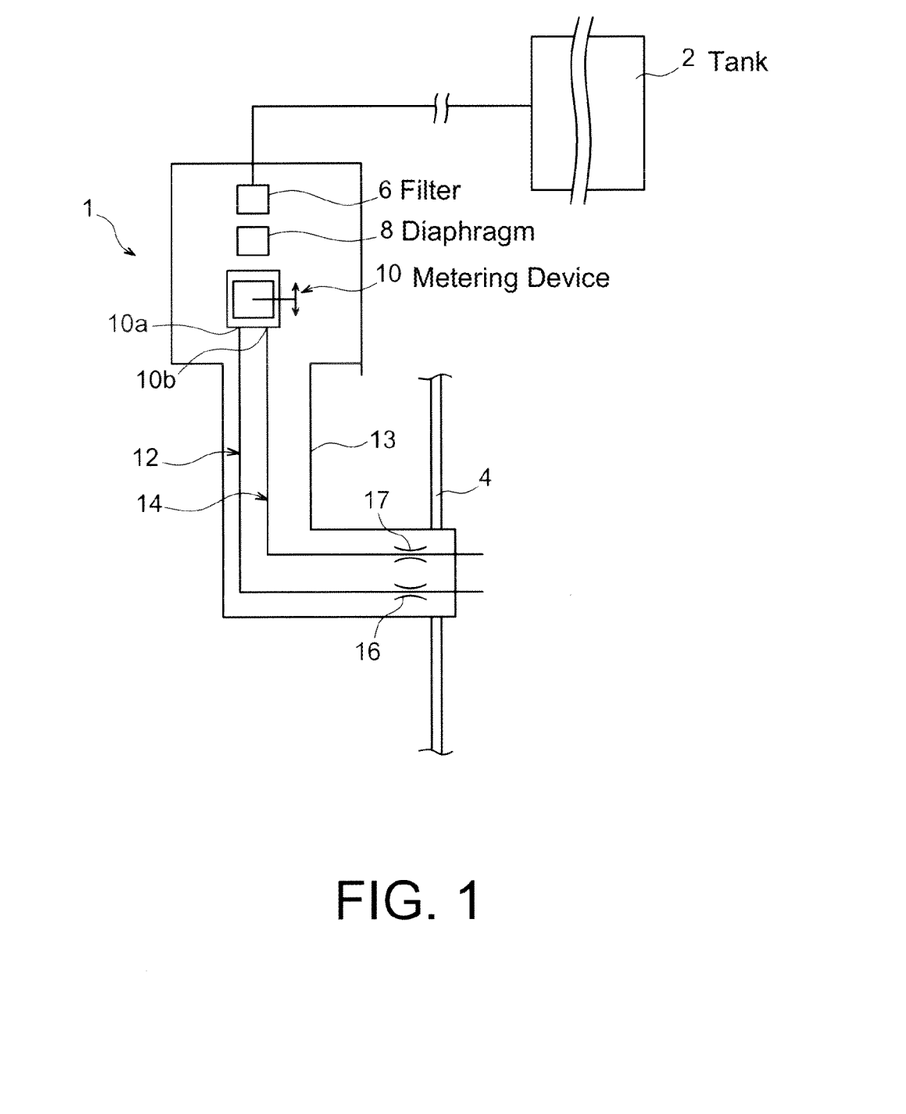
FIG. 1 shows a diagrammatic view of a fuel injector for turbomachine, according to a preferred embodiment of this invention.

FIG. 1 shows a fuel injector 1 for an aircraft turbomachine, according to a preferred embodiment of the invention.

The injector 1, of the "multimode" type (several supply circuits, here a dual fuel circuit), is connected upstream to the means for storing fuel, such as a tank 2. At its downstream end, the injector passes through a bottom of the combustion chamber 4, in a manner that is conventional and known to those skilled in the art.

Globally, the injector 1 comprises, from upstream to downstream in the direction of the flow of the fuel through this injector, a filter 6, a diaphragm 8 and a metering device 10. The device 10 comprises a first fuel outlet 10a as well as a second fuel outlet 10b separate from the first. The first outlet 10a supplies a primary fuel circuit 12, while the second outlet supplies a secondary fuel circuit 14, intended for the flow of higher flow rates in the direction of the combustion chamber. To each circuit 12, 14, in the proximity of the downstream end of the injector, is associated a swirler 16, 17 for the spraying/putting into rotation of the fuel.

All of the aforementioned elements of the injector are provided in an outer casing 13, which has the general shape of a finger or cane.

Figure 2A:
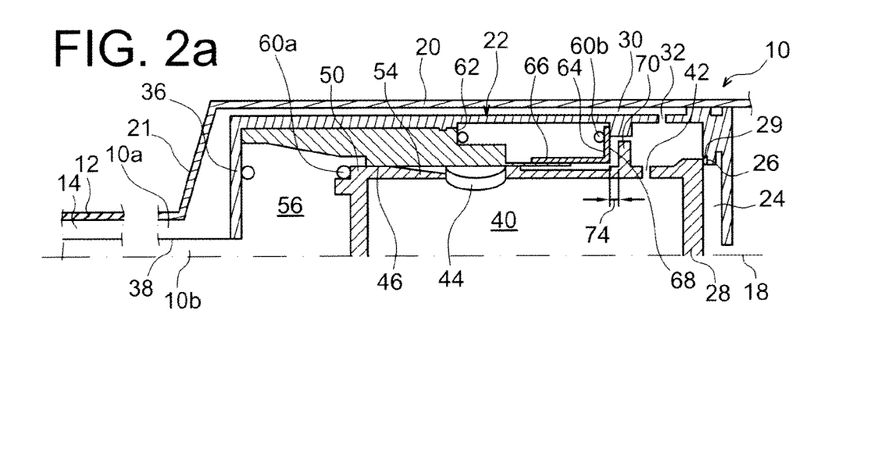
FIGS. 2a to 2c show in a more detailed manner the metering device of the injector of FIG. 1, as a half cross-section, according to a first embodiment of the invention, in different configurations adopted as the fuel pressure differential is accentuated between the upstream and the downstream of the metering device.
Figure 3A:
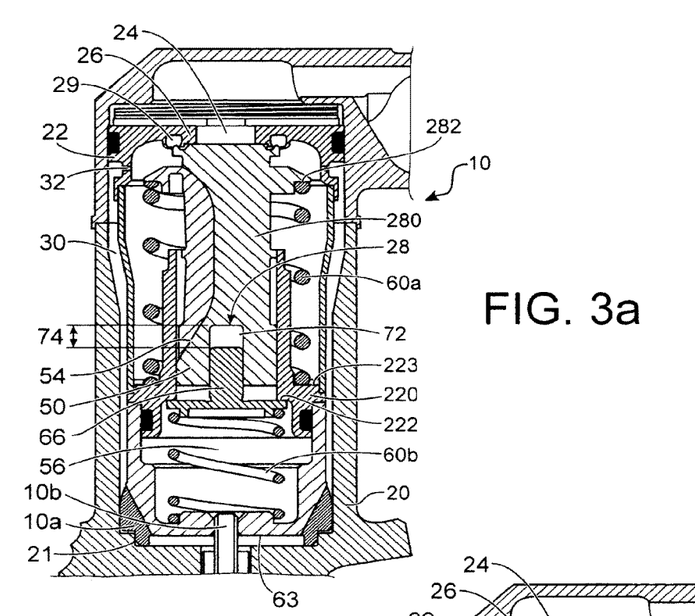
FIGS. 3a to 3c show in a more detailed manner the metering device of the injector of FIG. 1, as a cross-section, according to a second embodiment of the invention, in different configurations similar to those of FIGS. 2a to 2c and adopted as the fuel pressure differential is accentuated between the upstream and the downstream of the metering device.

FIGS. 2a and 3a more specifically show in detail the metering device 10 in closed configuration, wherein the fuel coming from the tank cannot penetrate through this device.

The device 10 is formed using a plurality of concentric elements with an axis 18 corresponding to the axis of the injector.

This is first a hollow outer body 20, with a constant circular section over a major portion of its length. The hollow outer body 20 of the first embodiment has a tapered narrowing 21 on the downstream end. More generally, the outer body 20 has the shape of a tube centred on the axis 18, and exteriorly defines the first outlet 10a.

Inside the body 20, a hollow intermediate body 22 is housed, with the latter able to be made using one or several parts fixed to one another. In the upstream portion, the intermediate body 22 has an opening 24 for the intake of the fuel, centred on the axis 18. In the vicinity of this opening, the body 22 defines a seat 26 for receiving a movable sealing member 28, the seat being provided with an O-ring seal 29.

The intermediate body 22 defines an annular fuel flow space 30 provided between this intermediate body and the outer body 20. In addition, it is provided that the intermediate body has orifices for the fuel to pass 32 from the inside of this intermediate body 22 to the fuel flow space 30. These orifices, located on the lateral wall of the body 22, are provided in the vicinity of the axial opening 24 that allows the fuel to enter the metering device.

In the downstream portion, the body 22 has a shoulder 36 which is continued by a tube 38 defining interiorly the first annular fuel outlet 10a with the outer body 20, and defining exteriorly the second fuel outlet 10b of circular section centred on the axis 18. Consequently, in the downstream portion, the fuel flow space 30 communicates with the first outlet 10a.

As mentioned hereinabove, the metering device 10 further comprises the sealing member 28 housed slidably movable in the intermediate body 20, along the axis 18.

The movable member 28 has an upstream end that comprises an upstream pressure surface that substantially has the shape of a pressure plate in the first embodiment, whereon the fuel can exert a force of displacement. The member 28 is hollow, defining a cavity 40 inside of which the fuel is intended to transit in order to reach the second outlet 10b, such as details will be given hereinafter. To do this, the lateral wall of the member 28 has fuel inlet orifices 42 located in the vicinity of the pressure plate, as well as fuel outlet orifices 44 located further downstream on this same lateral wall delimiting the cavity 40.

In the downstream portion of the intermediate body 22, a secondary opening 46 is made for the fuel to pass. In the configurations shown in FIGS. 2a and 3a, this opening 46 is sealed by a downstream end 50 of the movable member 28, with a circular section with a shape complementary to that of the opening. Means of sealing can be added if necessary.

Between this downstream end 50 and the fuel outlet orifices 44, the movable sealing member 28 has a portion 54 with a narrowed section that, when it is located opposite the secondary opening 46, makes it possible to release the latter by providing as such for the fuel to pass in the direction of the second outlet 10b communicating with this secondary opening. More precisely, the secondary opening 46 opens into a space 56 located under the downstream portion of the movable member, with this space 56 opening into the second outlet 10b.

The device 10 moreover comprises elastic return means that exert a force that causes the member 28 to be returned to its closed position shown in FIG. 2a, wherein the member 28 is pressing against the seat 26.

The elastic means of the preferred embodiments of FIGS. 2a to 2c and 3a to 3c comprise a first spring 60a and a second spring 60b. The first 60a and second springs 60b are in particular located along an axis 18 of the device 10 concentrically about this axis 18.

Figure 2B:
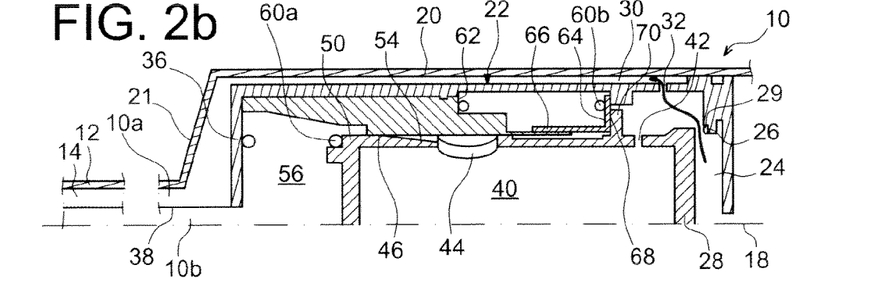
Figure 2C:
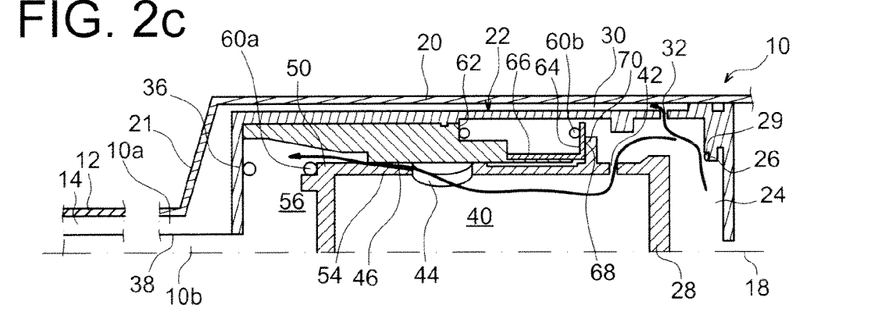

In reference more specifically to FIGS. 2a to 2c, the first spring 60a is pressing on the one hand against the shoulder 36 of the intermediate body 22, and on the other hand against the downstream end of the movable member 28. The second spring 60b is pressing against a downstream stop 62 of the intermediate body, and against an upstream stop 64 of a support part 66 mounted slidingly on the intermediate body, along the axis 18. Preferably, the upstream stop 64 is pressing against a shoulder 68 of the intermediate casing 22. Also, the second spring 60b pushes the upstream stop 64 against the shoulder 68, with this spring therefore being prestressed even in its relaxed position shown in FIG. 2a.

Furthermore, the movable member 28 has an additional support part 70 in the shape of a flange, intended to contact the stop 64 of the support part 66, only starting from and beyond a defined level of displacement of the member 28, such as details will be given hereinafter. Also, in closed position, there is an axial clearance 74 between the flange 70 and the upstream stop 64.

The first spring 60a of the first embodiment is located downstream of the second spring 60b in the fuel metering device 10. In addition, the first spring 60a is closer to the axis 18 of the metering device 10 than the second spring 60b.

Figure 3B:
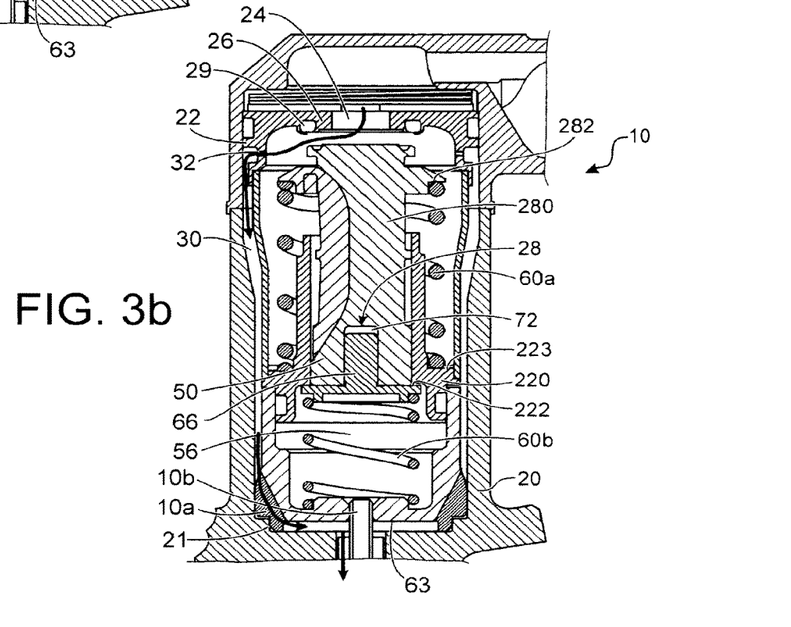
Figure 3C:
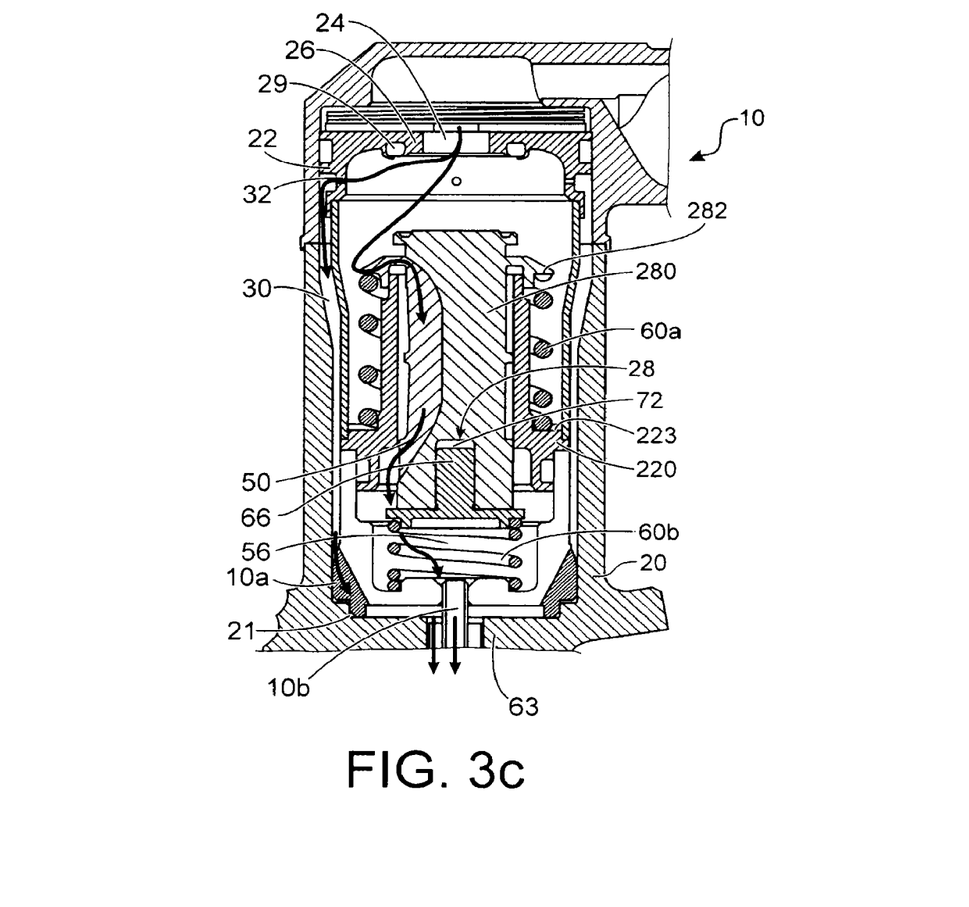

The embodiment shown in FIGS. 3a to 3c can be distinguished from the one shown in FIGS. 2a to 2c in that the first spring 60a is located upstream of the second spring 60b in the metering device 10. Moreover, the second spring 60b is closer to the axis 18 of the metering device 10 than the first spring 60a.

In FIG. 3a, the first spring 60a is pressing on the one hand against an edge 282 of the movable member 28 and on the other hand against an upstream shoulder 223 of a downstream hollow body 220 of the hollow intermediate body 22.

The second spring 60b of the second embodiment is provided between a fixed stop 63 of the device 10 and a support part 66 of the movable sealing member 28, with the movable sealing member 28 having an engaging element 72 configured to engage the support part 66.

The engaging element 72 is used to engage the support part 66 only starting from and beyond said defined level of displacement in the direction of the maximum open position of the movable sealing member 28 in a manner similar to the additional support part 70 of the first embodiment.

In FIG. 3a, the movable sealing member 28 comprises a piston 280 and the support part 66. The piston 280 then comprises the engaging element 72. In order for the movable member 28 to allow the fuel coming from the opening 24 to reach the second outlet 10b beyond said defined level of displacement of the member 28, a clearance 74 is provided in FIG. 3a between the engaging element 72 and the support part 66.

The support part 66 of the second embodiment is a safety valve, more precisely a stem valve. The safety valve 66 is configured to hermetically engage a downstream shoulder 222 of the downstream hollow body 220. The downstream shoulder 222 is located in particular downstream of the upstream shoulder 223 in the metering device 10.

Also the second spring 60b pushes the safety valve 66 against the shoulder 222, this spring 60b is therefore prestressed even in its relaxed position shown in FIG. 3a.

The engaging element 72 is a blind groove made in the piston 280, with the stem of the safety valve 66 being in particular able to be engaged as a stop in the groove 72 in the maximum open position.

In reference to FIGS. 2a to 2c and in FIGS. 3a to 3c, the operation of the metering device 10 shall be described.

Provided the fuel pressure differential between the upstream and the downstream of the device 10 does not exceed a threshold value, the member 28 remains in closed position such as shown in FIGS. 2a and 3a. In other terms, the return force deployed by the first spring 60a is sufficient to maintain the member 28 thrust against its seat 26, with this force being indeed greater than that resulting from the difference in pressure between the fuel pressure that is applied against the upstream pressure surface of the member 28, and the fuel pressure in the combustion chamber, substantially identical to that of the fuel contacting the downstream end of the member 28.

Preferably, the seal provided by the movable member in closed position can be maintained until a pressure differential of about 3.5 bars.

When this differential increases, the resulting force on the member 28 leads the latter to solicit the spring 60a, and therefore to be displaced from its closed position to a maximum open position. At the beginning of this displacement diagrammed in FIG. 2b and in FIG. 3b, which is carried out by compressing the spring 60a, the member 28 releases the opening 24 and activates the first fuel circuit. Indeed, the fuel coming from the tank can then be conveyed successively through the opening 24, the orifices for the fuel to pass 32 of the intermediate body 22, the annular space 30, then through the first outlet 10a before reaching the first circuit 12. During this first phase of travel of the movable member 28, only the first spring 60a is compressed, with the clearance 74 being consumed progressively as the member is displaced in the downstream direction. Still during this same first phase, the downstream end 50 of the member 28 passes through the secondary opening 46 while still closing it off, as such preventing the passage of the fuel to the secondary circuit, which remains inactive.

It is only when the movable member 28 has reached a defined level of displacement in the downstream direction that the secondary circuit of the injector is activated. This defined level of displacement, reached in an intermediate configuration between those shown in FIGS. 2b, 3b, 2c and 3c, is obtained when the portion 54 of narrowed section of the member arrives opposite the secondary opening 46, with the space created between the wall of this opening and the outer surface of the member allowing the fuel to pass. For the purposes of information, this here can be a portion 54 having axial slots for passing the fuel, spaced circumferentially from one another. In addition, these slots can be inclined axially in such a way as to approach the axis 18 in the upstream direction, in such a way as to increase the flow rate of the passing fuel as the member 28 is displaced downstream. The device 10 consequently provides a precise metering function, that depends on the level of displacement of the member 28 along the axis 18. With this respect, it is noted that FIG. 2c shows the movable member 28 in the maximum open position, allowing a maximum fuel flow rate to be obtained at the outlet of the injector.

As soon as the member 28 reaches its defined level of displacement, which reveals for example a pressure differential of about 7 bars, the fuel coming from the tank can flow successively through the fuel inlet orifices 42, the cavity 40, the fuel outlet orifices 44, the secondary opening 46, then through the space 56 opening into the second outlet 10b communicating with the second circuit 14 of the injector. At these high levels of flow rates where the fuel flows in the second circuit, it also continues to flow in the first circuit since the orifices for the fuel to pass 32 of the intermediate body 22 remain supplied by a portion of the fuel passing through the opening 24.

In reference more specifically to FIGS. 2a to 2c, the defined level of displacement of the member is reached after the second spring 60b has been solicited via the flange 70, by pressing of the latter against the stop 64 of the sliding part 66.

In the second embodiment, the defined level of displacement of the movable sealing member 28 is reached by the engaging of the safety valve 66 by the piston after having consumed at least partially the clearance 74 between an end of the stem of the safety valve 66 and the bottom of the groove 72 in the piston 280.

More generally, in order to reach this level of displacement in the first and in the second embodiment, the member has to counter the return force developed by each of the two springs 60a, 60b arranged in parallel. The defined level of displacement, corresponding to the point of commutation of the metering device, can be reached at the beginning of the compression of the second spring 60b, or after travel of the member during which the two springs are solicited in parallel.

Of course, various modifications can be made by those skilled in the art to the invention that has just been described, solely by way of unrestricted examples.

The invention claimed is:

1. A fuel metering device for a fuel injector of an aircraft turbomachine, the fuel metering device comprising a primary opening for fuel intake into the fuel metering device, a movable sealing member for sealing the primary opening, and elastic return means configured to urge the movable sealing member in a direction of a closed position in which the movable sealing member seals off said primary opening, the movable sealing member being configured to be displaced from the closed position under an effect of a fuel pressure applied on the movable sealing member,
wherein said fuel metering device comprises a first outlet, intended to communicate with a primary circuit of the fuel injector, and a second outlet intended to communicate with a secondary circuit of the fuel injector,
wherein the fuel metering device is configured such that movement of the movable sealing member up to a defined level of displacement of the movable sealing member in a direction of a maximum open position allows fuel flowing through said primary opening to reach said first outlet, and
wherein the movable sealing member allows fuel flowing through said primary opening to reach said second outlet only when the movable sealing member is displaced beyond said defined level of displacement,
wherein the fuel metering device further comprises:
a hollow outer body;
a hollow intermediate body housed in the hollow outer body, said primary opening being made in said hollow intermediate body and being provided with a seat for receiving the movable sealing member;
said movable sealing member housed to permit sliding movement in said hollow intermediate body;
a fuel flow space provided between the hollow intermediate body and the hollow outer body, the hollow intermediate body being provided with orifices for fuel to pass from inside of the hollow intermediate body to said fuel flow space, said orifices being positioned upstream of the elastic return means, with respect to fuel flow through the fuel metering device, said fuel flow space communicating with said first outlet;
a secondary opening for fuel to pass through, provided on the hollow intermediate body, the secondary opening being configured to be sealed by the movable sealing member when the movable sealing member is displaced less than said defined level of displacement, and said secondary opening being configured to be unsealed when the movable sealing member is displaced between the defined level of displacement and the maximum open position, said secondary opening communicating with said second outlet.

2. The fuel metering device according to claim 1, wherein when the movable sealing member is displaced beyond said defined level of displacement, the movable sealing member allows fuel flowing from said primary opening to reach said second outlet and said first outlet.

3. The fuel metering device according to claim 1, wherein said elastic return means comprise at least one first spring and a second spring, with said second spring being arranged so as to not be compressed by the movable sealing member over at least a portion of the travel of the movable sealing member from the closed position, and wherein said at least one first spring and said second spring are arranged so as to each be compressed by the movable sealing member when the movable sealing member is at said defined level of displacement.

4. The fuel metering device according to claim 3, wherein said at least one first spring and said second spring are arranged in parallel.

5. The fuel metering device according to claim 3, wherein said second spring is provided between a stop of the hollow intermediate body and a support part, and wherein the movable sealing member has an additional support part configured to contact said support part only when the movable sealing member is displaced to and beyond said defined level of displacement in the direction of the maximum open position.

6. The fuel metering device according to claim 3, wherein said second spring is provided between a fixed stop of the fuel metering device and a support part of the movable sealing member, and wherein the movable sealing member has an engaging element configured to engage the support part only when the movable sealing member is displaced to and beyond said defined level of displacement in the direction of the maximum open position.

7. The fuel metering device according to claim 1, wherein the movable sealing member defines a cavity inside of which fuel is intended to transit in order to reach said second outlet.

8. A fuel injector for an aircraft turbomachine comprising at least a fuel metering device,
wherein the fuel metering device comprises a primary opening for fuel intake into the fuel metering device, a movable sealing member for sealing the primary opening, and elastic return means configured to urge the movable sealing member in a direction of a closed position in which the movable sealing member seals off said primary opening, the movable sealing member being configured to be displaced from the closed position under an effect of a fuel pressure applied on the movable sealing member, wherein said fuel metering device comprises a first outlet, in communication with a primary circuit of the fuel injector, and a second outlet in communication with a secondary circuit of the fuel injector, wherein the fuel metering device is configured such that movement of the movable sealing member up to a defined level of displacement of the movable sealing member in a direction of a maximum open position allows fuel flowing through said primary opening to reach said first outlet, and wherein the movable sealing member allows fuel flowing through said primary opening to reach said second outlet only when the movable sealing member is displaced beyond said defined level of displacement, wherein the fuel metering device further comprises:
  a hollow outer body;
  a hollow intermediate body housed in the hollow outer body, said primary opening being made in said hollow intermediate body and being provided with a seat for receiving the movable sealing member;
  said movable sealing member housed to permit sliding movement in said hollow intermediate body;
  a fuel flow space provided between the hollow intermediate body and the hollow outer body, the hollow intermediate body being provided with orifices for fuel to pass from inside of the hollow intermediate body to said fuel flow space, said orifices being positioned upstream of the elastic return means, with respect to fuel flow through the fuel metering device, said fuel flow space communicating with said first outlet;
  a secondary opening for fuel to pass through, provided on the hollow intermediate body, the secondary opening being configured to be sealed by the movable sealing member when the movable sealing member is displaced less than said defined level of displacement, and said secondary opening being configured to be unsealed when the movable sealing member is displaced between the defined level of displacement and the maximum open position, said secondary opening communicating with said second outlet.

9. An aircraft turbomachine combustion chamber comprising a plurality of fuel injectors according to claim 8.

10. An aircraft turbomachine comprising the aircraft turbomachine combustion chamber according to claim 9.

* * * * *